(12) United States Patent  (10) Patent No.: US 6,680,144 B2
Choi  (45) Date of Patent: Jan. 20, 2004

(54) BATTERY SEPARATOR (75) Inventor: Wai M. Choi, West Newton, MA (US)

(73) Assignee: KVG Technologies, Inc., East Walpole, MA (US)

( * ) Notice: Subject to any disclaimer, the term of this patent is extended or adjusted under 35 U.S.C. 154(b) by 0 days.

(21) Appl. No.: 10/140,033

(22) Filed: May 6, 2002

(65) Prior Publication Data

US 2002/0165291 A1 Nov. 7, 2002

Related U.S. Application Data (63) Continuation-in-part of application No. 09/697,962, filed on Oct. 27, 2000, now Pat. No. 6,384,100, which is a continuation-in-part of application No. 09/429,820, filed on Oct. 29, 1999, now abandoned.
(60) Provisional application No. 60/308,983, filed on Jul. 30, 2001.

(51) Int. Cl.[7] .......................... H01M 4/02; H01M 2/16; C08J 3/28; C08F 2/46; C08F 255/00
(52) U.S. Cl. .................. 429/225; 429/223; 429/249; 429/250; 429/254; 442/334; 442/389; 442/394; 522/116; 522/120; 522/125; 522/157; 522/161
(58) Field of Search .................. 522/85, 114, 118, 522/120, 116, 119, 125, 157, 161; 521/33; 429/250, 221, 222, 223, 225, 229, 249, 254; 52/286, 287; 526/328, 329, 329.1, 329.2; 442/334, 389, 394

(56) References Cited

U.S. PATENT DOCUMENTS

| | | | | |
|---|---|---|---|---|
| 5,204,197 A | * | 4/1993 | Takai et al. | 429/249 |
| 5,270,137 A | * | 12/1993 | Kubota | 429/249 |
| 5,308,467 A | * | 5/1994 | Sugo et al. | 204/627 |
| 5,743,940 A | * | 4/1998 | Sugo et al. | 95/285 |
| 5,798,189 A | * | 8/1998 | Hayashida et al. | 429/101 |
| 5,807,643 A | * | 9/1998 | Yamamoto et al. | 429/101 |
| 5,888,916 A | * | 3/1999 | Tadokoro et al. | 442/334 |
| 6,037,079 A | * | 3/2000 | Tanaka et al. | 429/142 |
| 6,130,008 A | * | 10/2000 | Yuasa et al. | 429/250 |
| 6,248,475 B1 | * | 6/2001 | Hayashida et al. | 429/218.2 |
| 6,291,105 B1 | * | 9/2001 | Yamamoto et al. | 429/249 |
| 6,399,247 B1 | * | 6/2002 | Kitayama et al. | 429/223 |
| 6,444,367 B1 | * | 9/2002 | Kinn et al. | 429/250 |
| 2002/0177632 A1 | * | 11/2002 | Choi | 522/33 |

FOREIGN PATENT DOCUMENTS

WO  WO 93/01622  * 1/1993

OTHER PUBLICATIONS

John A. Cook, "Chemical Absortive Properties of Acrylic Acid Grafted Non–woven Battery Separators", SCIMAT Ltd.*
Leblanc et al, "Self–Discharge of Sealed Nickel–Metal Hydride Batteries", J. Electrochemical Soc., vol. 145, Mar. 1998.*

* cited by examiner

Primary Examiner—Susan W. Berman
(74) Attorney, Agent, or Firm—John C. Purdue; David C. Purdue (57) ABSTRACT A method for producing a battery separator is disclosed. The method comprises applying a coating of an ethylenically unsaturated monomer to the fibers of a non-woven sheet and polymerizing the monomer in situ on the fiber surfaces. The non-woven sheet is from 50 to 3000 microns thick, and is composed of polyolefin fibers having an average fiber diameter from 0.5 to 5 microns and a surface area from 0.2 to 30 square meters per gram. The ethylenically unsaturated monomer is polymerizable to a thermoplastic polymer which is hydrophilic as a consequence of containing COOH, OH, sulfonyl, sulfonic acid or carbonyl groups, or a monomer which has one of the following formulas:

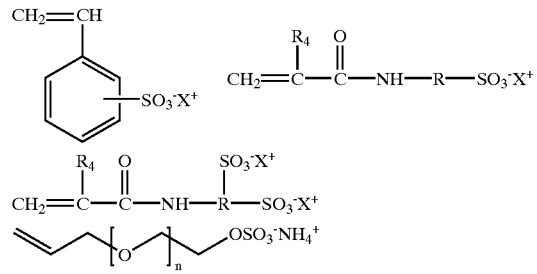

In the foregoing formulas, R is an aliphatic or aromatic hydrocarbon group having from 2 to 8 carbon atoms, $R_4$ is hydrogen or methyl, n is an integer from 2 to 15, and $X^+$ is a cation selected from the group consisting of hydrogen, alkali metal cations, alkaline earth cations, cations of the transition metals Sc, Ti, V, Cr, Mn, Fe, Co, Ni, Cu and Zn, and ammonium cations of the following formula:

$R_5R_6R_7R_8N^+$, each of $R_5R_6$, $R_7$ and $R_8$ is hydrogen, alkyl, alkenyl, cycloalkyl or cycloaklkenylene, and not more than one is a bivalent group bonded to $N^+$ and by removing two hydrogens from an alkane, an alkene, a cycloalkane or a cycloalkene; the total number of carbons in $R_5$ $R_6$, $R_7$ and $R_8$ does not exceed 21.

13 Claims, 3 Drawing Sheets

BATTERY SEPARATOR

REFERENCE TO RELATED APPLICATIONS

This is a continuation in part of U.S. application Ser. No. 09/697,962, filed Oct. 27, 2000 now U.S. Pat. No. 6,384,100, itself a continuation in part of application Ser. No. 09/429,820, filed Oct. 29, 1999, now abandoned. Priority is claimed under 35 USC, Section 119(e)(1), of Provisional Application No. 60/308,983, filed Jul. 30, 2001. Application Ser. No. 09/697,962 is now U.S. Pat. No. 6,384,100.

FIELD OF THE INVENTION

This invention relates to a battery separator and, more particulary, to such a separator which includes at least one non-woven sheet of organic fibers, particularly polyolefin fibers, and may include, in addition, at least one non-woven sheet of glass fibers.

BACKGROUND OF THE INVENTION

Battery separators which are non-woven sheets of polyolefin fibers are known, having been disclosed in a paper presented at a Power Sources Symposium in 1986 and published in a journal article, Akira Kitas, Seiji Yoshida and Shiro Tanso, "Characteristics of Large Sealed Ni—Cd Batteries with Grafted Nonwoven Fabrics Separator," pp. 413–419 and in U.S. Pat. Nos. 5,922,417 and 5,830,604, granted Jul. 13, 1999 and Nov. 3, 1998 to Singleton et al. These references disclose that the hydrophobic nature of polyolefin fibers makes sheets thereof unsuitable for use as battery separators, and a treatment to make the surfaces hydrophilic by graft polymerizing acrylic acid or the like to the surfaces. The Kitas et al. reference disclose the use of an electron beam to cause the graft polymerization, while Singleton et al. disclose the use of benzophenone as a photoinitiator and UV irradiation for that purpose.

The Instant Invention

The instant invention, in one aspect, is based upon the discovery of an improved method for providing a hydrophilic surface on polyolefin fibers. A non-woven sheet of the fibers with the hydrophilic surfaces can be used as a battery separator. The improved method involves treating the polyolefin fiber surfaces by high energy discharge, e.g., with plasma glow discharge, flame plasma, or an electron beam, coating the treated surfaces with a vinyl monomer such as acrylic acid or with a combination of vinyl monomers such as acrylic acid and triallyl cyanurate, and polymerizing the vinyl monomer or combination of vinyl monomers on the surfaces of the polyolefin fibers. The coating step can be carried out by dipping, printing, vapor deposition, or the like, while the step of polymerizing the vinyl monomer or the combination of vinyl monomers can be carried out using heat, UV irradiation, an electron beam, plasma glow discharge, flame plasma or the like.

In another aspect, the invention is based upon the discovery that a polymeric coating which is hydrophilic in nature can be produced on the surfaces of polyolefin fibers to make the surfaces hydrophilic so that a non-woven sheet of such fibers can be used as a battery separator.

In yet another aspect, the invention is based upon the discovery that polyolefin fibers can be coated with a mixture of a hydrophilic monomer and a copolymerizable acid monomer and the mixture can be reacted to form a grafted copolymer or to form a copolymer coating on the fibers.

In still another aspect, the invention is based upon the discovery that the copolymerizable acid can be a sulfonate, so that the grafted polymer or coating produced on the surfaces of the polyolefin fibers has highly specific properties.

In yet another aspect, the invention is based upon the discovery of a battery separator comprising at least one layer of a fabric containing polyolefin fibers, from 1 percent by weight to 80 percent by weight of which are dividable fibers composed of polypropylene segments and polyethylene segments, and from 10 percent by weight to 50 percent by weight of which are sheathcore fibers having a polypropylene core and a polyethylene sheath, the surfaces of the polyolefin fibers are hydrophilic as a consequence of plasma discharge treatment which occurs upon ionization of a suitable atmosphere, i.e., one containing $SF_6$, $CHFCl_2$, oxygen, argon, or the like. The separator also comprises at least one layer which is a wetlaid or drylaid glass fiber sheet, a porous polymer film, a meltblown web of polymer fibers, a drylaid web composed of glass fibers and polymer fibers, a woven glass fiber web or a woven polymer fiber web. The multiple layers are chemically bonded or heat bonded together, or are mechanically entangled or hydroentangled.

DESCRIPTION OF THE PREFERRED EMBODIMENTS

The following examples, in which, as elsewhere herein, the terms "percent" and "parts" refer to percent and parts by weight, unless otherwise indicated, constitute the best modes of practicing the invention presently contemplated by the inventor. The following terms have the indicated meanings: "GDP" means glow discharge plasma, "MHz RF" means megahertz, radio frequency; "W" means watt or watts; "M rd" means the absorbed dose of ionizing radiation in megarad; "kv" means kilovolts; "m amperes" means milliamperes; "$\mu$m" means micrometer or micrometers, "mm" means millimeter or millimeters "cm" means centimeter or centimeters; and "m" means meter or meters.

Example 1 discloses the treatment of the surfaces of a non-woven polypropylene fabric by exposure to GDP, application of acrylic acid monomer to the treated surfaces of the fabric, and electron beam irradiation of the acrylic acid on the treated fiber surfaces to form a hydrophilic graft polymer on the fiber surfaces.

Example 1

A non-woven polypropylene fabric made from thermally bonded, endless, single component polypropylene fibers is exposed to GDP, and to acrylic acid monomer, and is then irradiated with electron beam radiation to form a hydrophilic coating on the fiber surfaces. The non-woven fabric used has a nominal thickness of 230 $\mu$m, and a weight of about 40 grams per square meter. The polypropylene fibers in the fabric range in diameter from 5 $\mu$m to 10 $\mu$m.

Figure 1:
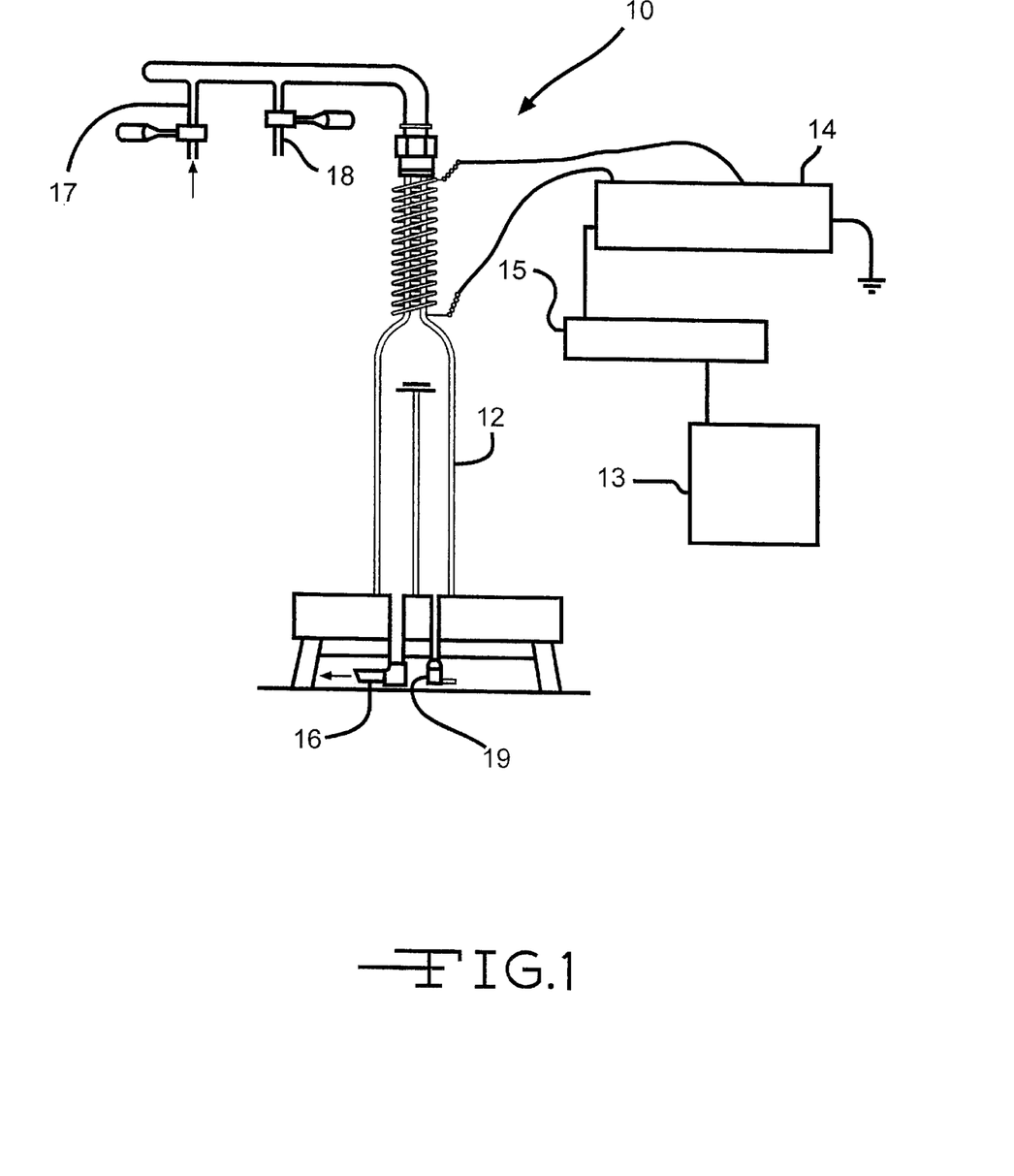
FIG. 1 is a somewhat schematic representation of known apparatus that is used as subsequently described herein to subject a fabric composed of fibers of a polyolefin to glow discharge plasma in preparation for grafting a hydrophilic monomer to the fiber surfaces.

The polypropylene fabric is treated in a system which is indicated generally in FIG. 1 by the reference numeral 10. (FIG. 1 is a copy of FIG. 12 of U.S. Pat. No. 5,804,263 with different reference numerals; the apparatus is described in more detail in said patent.) A coil 11 of copper tubing is wound around a portion of a pyrex vacuum chamber reactor 12 to excite a GDP. The system illustrated uses a 13.56 MHz RF generator 13 (Model HFS 40155, RF Plasma Products, Inc.) rated to 500 W. The coil 11 and the generator 13 are matched using a matching network 14 (Model AMN-502, RF Plasma Products, Inc.) and controller 15. The fabric is placed in the reactor 12, which is then evacuated by a vacuum pump (not illustrated) which is attached to a line 16 to a pressure of about 20 microns Hg; argon is then admitted to the system through a line 17 to initiate the GDP at a pressure of about 200 microns Hg. Plasma power is 10–50 W, the fabric is exposed to the GDP for 90 seconds and then to air which enters the apparatus through a line 18 upon release of the vacuum. The fabric is then placed in a 10% aqueous acrylic acid solution; the system is degassed by argon purge, and the fabric is then irradiated by a Cobalt-60 source to a dose of about 0.01 M rad. Samples are thoroughly washed with water to remove homopolymer and/or residual monomer. A thermocouple gauge control (not illustrated) can be connected to the apparatus through a line 19.

As is indicated above, the procedure of Example 1 produces a hydrophilic graft on the surfaces of the polyolefin fibers. The procedure can be modified so that a coating will be produced by adding a cross-linker such as triallyl isocyanurate to the acrylic acid solution in which the fabric is placed before the irradiation with Cobalt 60. A hydrophilic polymeric coating is formed by the modified procedure on the surfaces of the polyolefin fibers.

Example 2, discloses the treatment of the surfaces of a non-woven polypropylene fabric by exposure to glow discharge plasma, application of a solution of acrylic acid monomer, benzophenone as a photoinitiator and triallyl cyanurate to the treated surfaces of the fabric, and UV irradiation of the acrylic acid, benzophenone and triallyl cyanurate on the treated fiber surfaces, while they are in a nitrogen atmosphere, to form a hydrophilic graft polymer bonded to the surfaces of the fibers.

Example 2

A non-woven fabric composed of polyethylene/polypropylene sheath core fibers and polypropylene fibers is subjected to plasma treatment as described in Example 1 in the system indicated generally in FIG. 1 by the reference numeral 10. The sheath core fibers and the polypropylene fibers are 5 $\mu$m to 30 $\mu$m in diameter; the sheath core fibers have a polypropylene core and a polyethylene sheath. The fabric has a nominal thickness of 0.23 mm and a weight of about 40 grams per square meter. The plasma-treated fabric is then immersed in a 20 percent by weight solution of acrylic acid in acetone which also contains 2 percent by weight of benzophenone and 5 percent by weight of triallyl cyanurate; the fabric is then removed from the acrylic acid solution, and squeezed between spaced rolls to remove excess acrylic acid solution, leaving about 50 to 150 percent of the solution, based upon the weight of the fabric. The fabric and the acrylic acid solution carried thereby are then placed inside a polyethylene bag. Nitrogen is introduced into the bag to purge the air originally present therein, and to establish a nitrogen atmosphere inside the bag. The bag is then closed, and moved under a UV lamp which is 8 inches (20.3 cm) in length at a speed of 8 to 10 feet per minute (2.44 to 3.05 m per minute). The distance from the UV source to the sample surface ranges from 4⅞ inches to 5½ inches. The sample is then removed from the polyethylene bag.

The procedure of Example 2, as is indicated above, produces a coating on the surfaces of the fibers. The procedure can be modified so that, instead, it produces a graft polymer. All that is necessary is to omit the triallyl cyanurate from the acrylic acid solution in which the plasma treated fabric is immersed.

Example 3, discloses the treatment of the surfaces of a non-woven polypropylene fabric by exposure to glow discharge plasma, condensation of acrylic acid monomer vapor on the treated surfaces of the fabric, and electron beam irradiation of the acrylic acid on the treated fiber surfaces to form a hydrophilic graft polymer.

Example 3

An acrylic acid graft polymer is applied to a nonwoven web made up of a layer of a polypropylene meltblown fabric and a superimposed layer of a polypropylene drylaid fabric which is commercially available from Hollingsworth & Vose Company, East Walpole, Mass. under the designation PE 13030NQ. The meltblown fabric, which weighs 30 grams per square meter, is composed of polypropylene fibers having an average diameter of about 5 $\mu$m, and ranging from 1 $\mu$m to 10 $\mu$m, while the drylaid fabric, which weighs 14 grams per square meter, is composed of polypropylene fibers which have an average diameter of about 12 $\mu$m.

Figure 2:
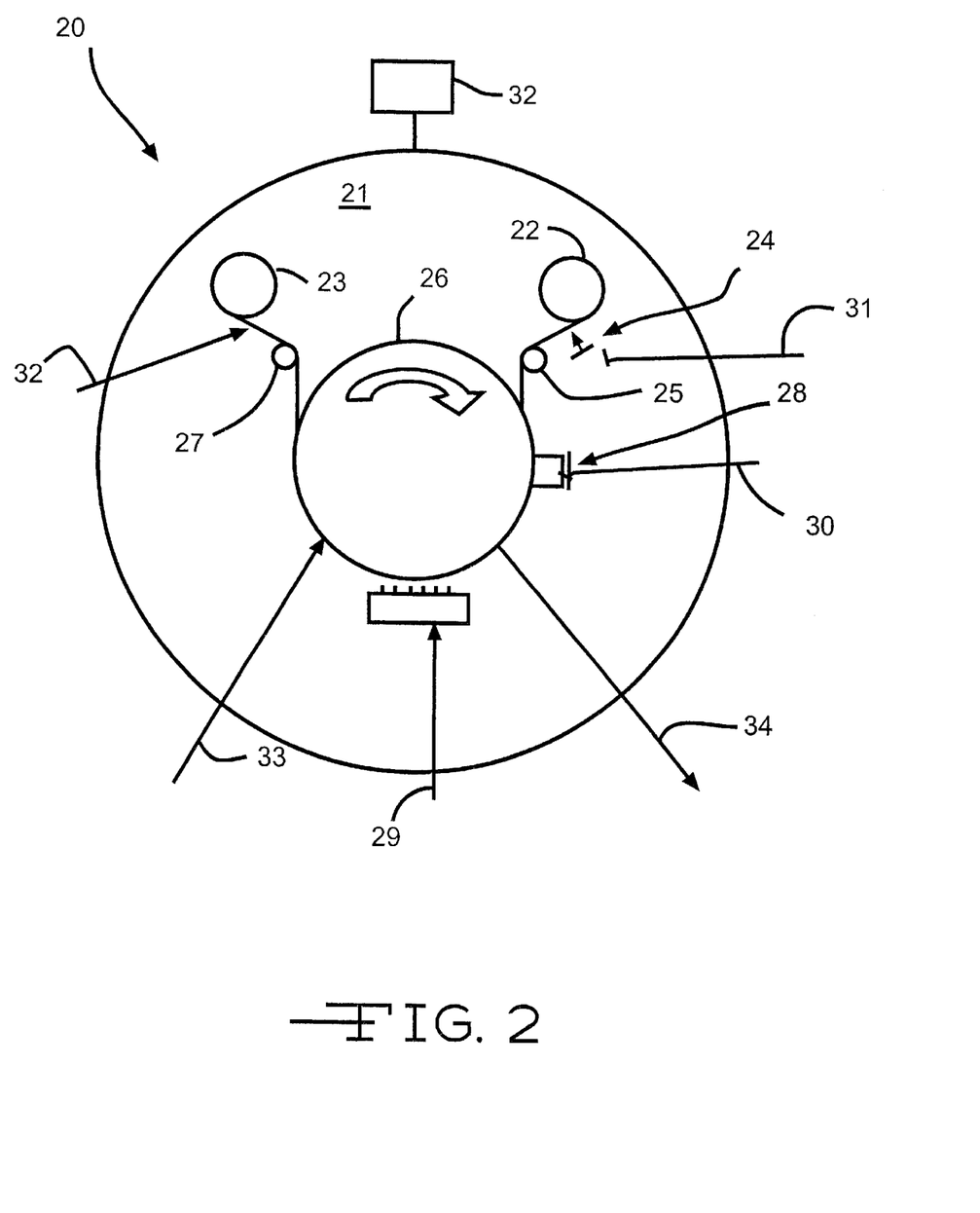
FIG. 2 is a schematic diagram showing apparatus which can be used to subject a fabric composed of polyolefin fibers to glow discharge plasma in preparation for, and to apply a coating of a hydrophilic polymer to the fiber surfaces or in preparation for, and to graft polymerize a hydrophilic monomer with the fiber surfaces.

The acrylic acid polymer coating is produced in apparatus indicated schematically at 20 in FIG. 2. The apparatus 20 comprises a vacuum chamber 21 in which there are supply and takeup rolls 22 and 23, respectively, for the nonwoven web to which a graft polymer is to be applied, and for the web to which the graft polymer has been applied. Web from the supply roll 22, which is processed at 45.7 meters per minute, is treated by plasma discharge as indicated at 24 to prepare it to receive the acrylic acid graft, passes over a roll 25, around a grounded rotating drum 26, over a roll 27 and to the takeup roll 23. Acrylic acid is vaporized in an evaporator 28, and is condensed on the web surface which has been treated by plasma discharge. The condensed acrylic acid is then irradiated by an electron beam as indicated at 29 to cause the graft polymerization. The evaporator 28 can be that indicated generally at 110 in FIG. 5 of U.S. Pat. No. 4,954,371, and can be operated so that the amount of acrylic acid condensed on the web is about 1 to 2 grams per square meter. Argon from a line 30 can be mixed with the acrylic acid vaporized in the evaporator 28 to control the thickness of an acrylic acid polymer which forms on the web. In general, the evaporator 28 uses heat to cause evaporation of the acrylic acid, but, if operating the evaporator at a given temperature produces a thicker coating of acrylic acid than is desired on the web, argon can be introduced through the line 30 to dilute the vaporized acrylic acid to control coating thickness, which varies as an inverse function of the rate at which argon is introduced.

Argon can also be introduced through a line 31 to provide an argon atmosphere to enable plasma glow discharge, which is carried out at a power level of 50 watts, and involves passing the web beneath metal shoes (not illustrated) which are charged by alternating current and are spaced a fraction of an inch from the web surface. A vacuum pump 32 maintains a pressure of 0.1 Torr or less in the chamber 21. The electron beam irradiation is at 10 kv and 20 m Amperes. During production of the polymer coating, a cooling fluid is circulated through the interior of the drum 26 to maintain its surface temperature at about 25° C. or less, flowing thereto through an inlet 33 and therefrom through an outlet 34.

The vacuum pump 32 evacuates the apparatus 20 to maintain a desired pressure therein, which, as indicated, usually is 0.1 Torr or less, preferably 0.01 Torr or less, and, most desirably, $1 \times 10^{-4}$ Torr or less.

Example 4, discloses the treatment of the surfaces of the fibers of a non-woven polyelefin fabric by immersion of the fabric in a solution of acrylic acid monomer, sodium p-styrene sulfonic acid and benzophenone, and UV irradiation of the acrylic acid, p-styrene sulfonic acid and benzophenone on the treated fiber surfaces, while they are in a nitrogen atmosphere, to form a hydrophilic grafted copolymer.

Example 4

An acrylic acid styrene-sulfonic acid graft copolymer is applied to a nonwoven web composed of polyethylene/polypropylene sheath core fibers and polypropylene fibers. The web is produced from a charge composed of 17.04 parts by weight of 0.7 denier polypropylene fibers, 18.18 parts by weight of 2.2 denier polypropylene fibers and 64.78 parts by weight of 0.9 denier polyethylene/polypropylene sheath core fibers with a polyethylene sheath and a polypropylene core. All of the fibers are 38 mm in length. A sheet of the nonwoven web is immersed in a solution in water containing 29.24 percent by weight of acrylic acid, 5.85 percent by weight of sodium p-styrenesulfonic acid and 0.58 percent by weight of benzophenone. The sheet of the nonwoven web is then removed from the solution, and placed inside a polyethylene bag. Nitrogen is introduced into the bag to purge the air originally present therein, and to establish a nitrogen atmosphere inside the bag. The bag is then closed, and moved under a UV lamp which is 8 inches (20.3 cm) in length at a speed of 8 to 10 feet per minute (2.44 to 3.05 m per minute). The distance from the UV source to the sample surface ranges from 4⁴⁄₇ inches to 5½ inches. The sample is then removed from the polyethylene bag.

Figures 3, 3A, 3B:
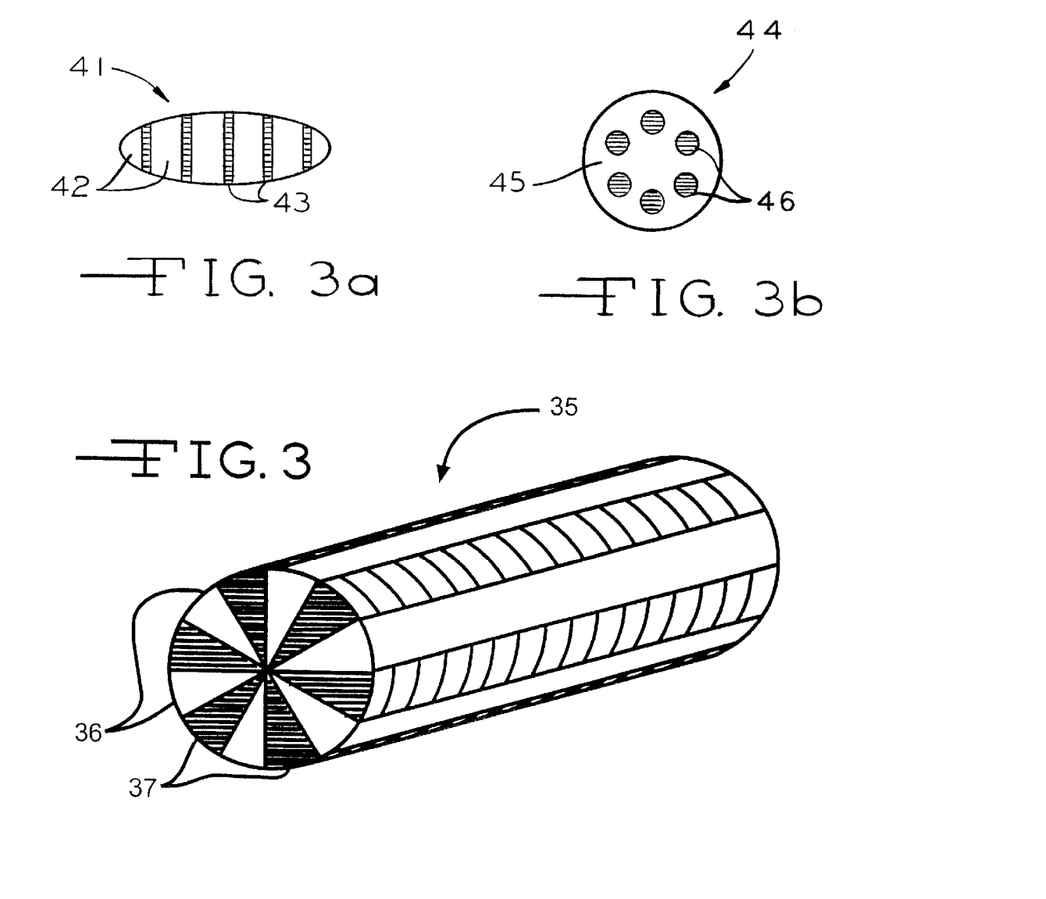
FIG. 3 is a perspective view showing a dividable fiber which can be a component of a fabric and can be treated according to the invention to have a hydrophilic surface.
FIG. 3a is an end view showing another dividable fiber which can be a component of a fabric and can be treated according to the invention to have a hydrophilic surface.
FIG. 3b is an end view of still another dividable fiber which can be a component of a fabric and can be treated according to the invention to have a hydrophlic surface.
Figure 4:
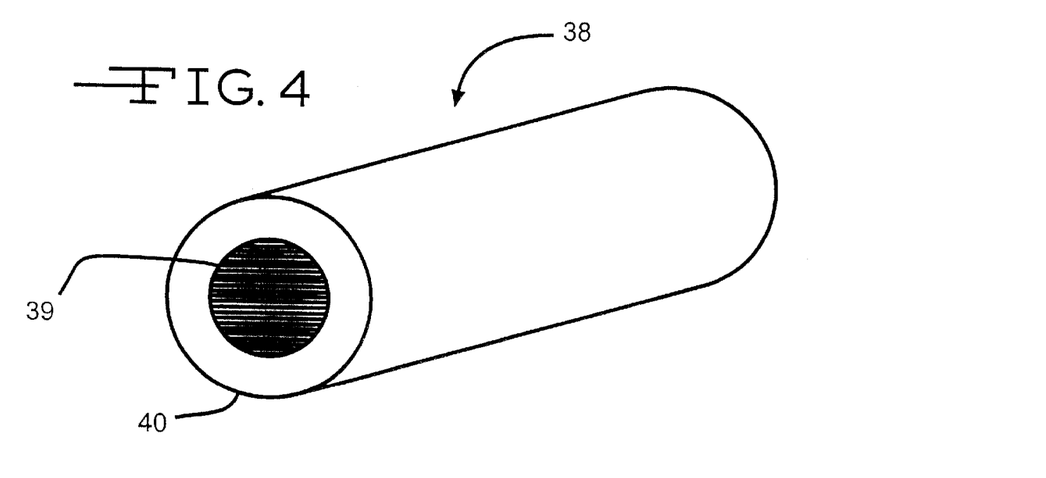
FIG. 4 is a view in perspective which shows a sheathcore fiber which can be a component of a fabric, and can be treated according to the invention to have a hydrophilic surface.

Example 5 describes the production of a battery separator comprising a layer of a fabric containing polyolefin fibers, substantially 60 percent by weight of which are dividable fibers indicated generally at 35 in FIG. 3, and composed of polypropylene segments 36 and polyethylene segments 37, and substantially 40 percent by weight of which are sheathcore fibers indicated generally at 38 in FIG. 4, and having a polypropylene core 39 and a polyethylene sheath 40. The surfaces of the polyolefin fibers 35 and 38 are made hydrophilic as a consequence of exposure to plasma discharge in the presence of argon. The separator also comprises a layer of a wetlaid glass fiber sheet which is heat bonded to the fabric layer containing polyolefin fibers.

Example 5

A non-woven web is produced from 60 parts by weight of dividable fibers 35 (FIG. 3) composed of four polyethylene segments 36 which are pie shaped in section and four polypropylene segments 37 which are also pie shaped in section and 40 parts by weight of sheathcore fibers 38 (FIG. 4) composed of a polypropylene core 39 and a polyethylene sheath 40 which surrounds the core 39. The dividable fibers 35 have an average diameter of 10 to 100 microns; they can be produced as described in U.S. Pat. No. 5,551,588, Sep. 3, 1996. The sheathcore fibers 38 have an average diameter of 10 microns and a surface area of 0.3 square meters per gram; they can also be produced as described in U.S. Pat. No. 5,551,588. The fibers 35 and 38 are suspended in a gaseous medium, collected as a web of non-woven fabric about 200 microns in thickness, and weighing 40 to 80 grams per square meter, and wound on a roll.

The non-woven fabric produced as described in the preceding paragraph is then treated by plasma discharge at a power level of 50 watts to make the surfaces of the fibers 35 and 38 hydrophilic, so that the fabric is suitable for use as a separator material. The plasma discharge treatment can be carried out in the apparatus 20 of FIG. 2 where the web is passed beneath metal shoes that are spaced a fraction of an inch from the web surface and an atmosphere of argon or the like is maintained therein.

The proportions in which the fibers 60 and 63 are used in the procedure of Example 5 can be varied so that the former ranges from 20 percent by weight to 80 percent by weight and the latter ranges from 10 percent by weight to 50 percent by weight.

Dividable fibers indicated generally at 41 in FIG. 3a, which are composed of six polyethylene segments 42 and six polypropylene segments 43, can also be used in practicing Example 5, as can dividable fibers indicated generally at 44 in FIG. 3b, which are composed a polyethylene matrix 45 in which six polypropylene fibers 46 are embedded.

Example 6 discloses the plasma treatment of the surfaces of fibers of a non-woven polyolefin fiber fabric to make them hydrophilic.

Example 6

A nonwoven web was produced on a paper machine from a slurry of sheathcore fibers having an average diameter of 10 microns, and composed of a polypropylene core and a polyethylene sheath. The web, which weighed 50 grams per square meter, was subjected to a high pressure jet of water in a known process called "hydro-entanglement" and heated to cause fibers to bond to one another at points of contact. A roll 22 of this fabric was placed in the vacuum chamber 21 of the apparatus 20 (FIG. 2) and fed over the drum 26 and onto the takeup roll 23. The apparatus 20 was then closed, and evacuated to a pressure less than 0.4 Torr. Argon which contained 5 percent by volume of oxygen was then introduced into the chamber 21, and the web was subjected to plasma discharge as indicated at 24 as it was advanced at about 6 meters per minute from the roll 22 to the roll 23. Monomer was not condensed thereon, and the web was not subjected to electron beam irradiation.

The web produced and treated as described above was found to have a basis weight of 51.6 grams per square meter, a thickness of 0.0056 inch (0.142 millimeter), a tensile strength in the machine direction (i.e., the direction in which the web traveled on the paper machine) of 14.1 pounds per inch, an air permeability at a pressure difference of 0.5 inch water of 78, a mean pore size of 21.4 microns, and a 30 second wicking of 0.75 inch for 40 percent KOH. The web absorbed 364 percent of its weight of 40 percent KOH.

A lead acid battery having two negative electrodes and one positive electrode, with two layers of the web produced as described in Example 6 wrapped around the positive electrode as a separator was formed at a charging current of 1.5 amperes for 60 hours, end voltage, after charging, 2.8293 volts. The battery was discharged at 1.0 ampere until its voltage reached 1.75 volts per cell, and was found to have a discharge capacity of 20 ampere hours.

Example 7 discloses electron beam treatment to activate the surfaces of fibers of a non-woven polyolefin fabric, immersion of the fibers with activated surfaces in an aqueous acrylic acid solution, and heating the fibers and acrylic acid solution to make the fibers hydrophilic.

Example 7

A drylaid web was produced from sheathcore fibers having an average diameter of 10 microns, and composed of a polypropylene core and a polyethylene sheath. The web, which weighed 50 grams per square meter, was placed in a chamber in which an atmosphere of nitrogen which contained less than 200 parts per million of oxygen was established and maintained The web, while still in the nitrogen atmosphere, was then subjected to electron beam irradiation, was immersed in an aqueous solution containing 20 percent of acrylic acid monomer, was passed between squeeze rolls to remove excess acrylic acid solution, leaving from 50 to 150 percent of the solution, based upon the weight of the fibers, and was heated to a temperature ranging from 100° F. to 150° F.

The web produced and treated as described above was found to have a basis weight of 239 grams per square meter, a thickness of 0.022 inch (0.559 millimeter), a tensile strength in the machine direction (i.e., the direction of movement of the conveyor on which the fibers were collected) of 7.69 pounds per inch, an air permeability at a pressure difference of 0.5 inch water of 319, a mean pore size of 92 microns, and a 30 second wicking of 0.032 inch for 40 percent KOH. The web absorbed 483 percent of its weight of 40 percent KOH, and had an ion exchange capacity of 2.46 milliequivalents per gram.

A lead acid battery having two negative electrodes and one positive electrode, with two layers of the web produced as described in Example 7 wrapped around the positive electrode as a separator was formed at a charging current of 1.5 amperes for 60 hours, end voltage, after charging, 3.16 volts. The battery was discharged at 1.0 ampere until its voltage reached 1.75 volts per cell, and was found to have a discharge capacity of 17.93 ampere hours.

Example 8 discloses electron beam treatment to activate the surfaces of fibers of a non-woven polyolefin fabric, immersion of the fibers with activated surfaces in an aqueous solution which contained acrylic acid and p-styrenesulfonic acid, and heating the fibers and solution to make the fibers hydrophilic.

Example 8

The procedure of Example 7 was repeated, except that the aqueous solution in which the web was immersed after electron beam irradiation contained 20 percent of acrylic acid and 5 percent of sodium p-styrenesulfonic acid. The resulting web was found to have a basis weight of 80.6 grams per square meter, a thickness of 0.016 inch (0.4067 millimeter), a tensile strength in the machine direction (i.e., the direction of movement of the conveyor on which the fibers were collected) of 17 pounds per inch, an air permeability at a pressure difference of 0.5 inch water of 138 cubic feet per minute, and a mean pore size of 30.8 microns. The web had an ion exchange capacity of 0.319 milliequivalents per gram.

A lead acid battery having two negative electrodes and one positive electrode, with two layers of the web produced as described in Example 8 wrapped around the positive electrode as a separator, after charging at 1.5 amperes, was found to have a discharge capacity, when discharged at 1.0 ampere, of 14.9 ampere hours.

Example 9 discloses the treatment of the surface of a non-woven sheet of polyolefin fibers by electron beam radiation, followed by impregnation of the treated sheet in an aqueous acrylic acid solution, and treatment of the two surfaces of the impregnated sheet by electron beam irradiation.

Example 9

Non-woven, wet-aid sheets 15¼ cm square which were about 0.23 mm in thickness, and weighed about 40 g per square meter were conveyed, in air, through a beam from an electron beam generator which was operated at 100 KV and at a current of 10 to 20 m amperes, total dose 3 M rads. The conveyor speed was about 1825 cm per minute. The non-woven sheets were ones produced from a slurry which contained 50 parts of 0.7 denier polypropylene fibers, and 50 parts of 0.9 denier polyethylene/polypropylene sheath core fibers. The electron beam was 25 mm wide and 250 mm long, so that it required about one half second for each sheet to be conveyed therethrough.

The non-woven sheets, after electron beam treatment, were immersed in and saturated by a solution which contained 32 parts acrylic acid, 0.7 part benzophenol, 67.19 parts water and 0.2 part polyethylene glycol alkyl aryl ether surfactant which is commercially available under the designation Triton X 100. After excess solution drained from the sheets, they were placed in a nitrogen atmosphere which contained 1 to 3 parts per million oxygen; and both of their major surfaces were subjected to electron beam radiation. The radiation dose with which one major surface was treated was 6 Mrads while that with which the other major surface was treated was 3 Mrads. The final non-woven sheets had an ion exchange coefficient ranging from 0.186 to 0.461 milliequivalents per gram.

The procedure of Example 9 was repeated as Examples 10–12, using different acrylic acid solutions to impregnate the non-woven sheets after the first electron beam treatment. The constituents in the acrylic acid solutions, in parts by weight, and the range, in the final non-woven sheets, of ion exchange coefficients are given in the following Table.

|  | Example 10 | Example 11 | Example 12 |
| --- | --- | --- | --- |
| Acrylic acid | 32 | 32 | 32 |
| Benzophenol | . . . | 0.7 | 0.7 |
| Hydroxymethyl phenylpropane-1-one | . . . | . . . | 0.1 |
| Cyanurate | . . . | 0.2 | 0.2 |
| Water | 67.8 | 66.9 | 66.8 |
| Polyethylene glycol alkyl aryl ether surfactant | 0.2 | 0.2 | 0.2 |
| Ion exchange coefficient; milliequivalents per gram | 0.109–0.171 | 0.100–0.101 | 0.074–0.125 |

Example 13

The fabric described in Example 2 is subjected to electron beam activation and is treated with an acrylic acid solution as described in Example 7, and is then subjected to UV radiation as described in Example 2. A lead acid battery having two negative electrodes and one positive electrode, with two layers of the web produced as described in this Example wrapped around the positive electrode as a separator, is charged at 1.5 amperes, and its discharge capacity is determined.

Example 14

The fabric described in Example 2 is subjected to electron beam activation as described in Example 7, and is then exposed to acrylic acid vapor and subjected to Electron Beam treatment as described in Example 3. A lead acid battery having two negative electrodes and one positive electrode, with two layers of the web produced as described in this Example wrapped around the positive electrode as a separator, is charged at 1.5 amperes, and its discharge capacity is determined.

Example 15

The fabric described in Example 2 is subjected to electron beam activation as described in Example 7, is exposed to acrylic acid vapor as described in Example 3, and then is subjected to the plasma treatment described in Example 2. A lead acid battery having two negative electrodes and one positive electrode, with two layers of the web produced as described in this Example wrapped around the positive electrode as a separator, is charged at 1.5 amperes, and its discharge capacity is determined.

Example 16

The fabric described in Example 2 is activated with plasma and treated with an acrylic acid solution as described in that Example and is then subjected again to the same plasma treatment. A lead acid battery having two negative electrodes and one positive electrode, with two layers of the web produced as described in this Example wrapped around the positive electrode as a separator, is charged at 1.5 amperes, and its discharge capacity is determined.

Example 17

The fabric described in Example 2 is activated with plasma and treated with acrylic acid vapor as described in Example 3 and is then subjected again to the same plasma treatment. A lead acid battery having two negative electrodes and one positive electrode, with two layers of the web produced as described in this Example wrapped around the positive electrode as a separator, is charged at 1.5 amperes, and its discharge capacity is determined.

Example 18

The fabric described in Example 2 is activated by plasma and treated with an acrylic acid solution as described in that Example and is then heated as described in Example 7. A lead acid battery having two negative electrodes and one positive electrode, with two layers of the web produced as described in this Example wrapped around the positive electrode as a separator, is charged at 1.5 amperes, and its discharge capacity is determined.

Example 19

The fabric described in Example 2 is activated by plasma and treated with acrylic acid vapor as described in Example 3 and is then subjected to UV radiation as described in Example 2. A lead acid battery having two negative electrodes and one positive electrode, with two layers of the web produced as described in this Example wrapped around the positive electrode as a separator, is charged at 1.5 amperes, and its discharge capacity is determined.

Example 20

The fabric described in Example 2 is activated by plasma and treated with acrylic acid vapor as described in Example 3 and is then heated as described in Example 7. A lead acid battery having two negative electrodes and one positive electrode, with two layers of the web produced as described in this Example wrapped around the positive electrode as a separator, is charged at 1.5 amperes, and its discharge capacity is determined.

Example 21

The fabric described in Example 2 is subjected to electron beam activation and treated with an acrylic acid solution as described in Example 9 and is then subjected to the plasma treatment described in Example 2. A lead acid battery having two negative electrodes and one positive electrode, with two layers of the web produced as described in this Example wrapped around the positive electrode as a separator, is charged at 1.5 amperes, and its discharge capacity is determined.

Example 22

The fabric described in Example 2 is subjected to electron beam activation as described in Example 9 and treated with acrylic acid vapor as described in Example 3 and is then subjected to UV radiation as described in Example 2. A lead acid battery having two negative electrodes and one positive electrode, with two layers of the web produced as described in this Example wrapped around the positive electrode as a separator, is charged at 1.5 amperes, and its discharge capacity is determined.

Example 23

The fabric described in Example 2 is subjected to electron beam activation as described in Example 9 and treated with acrylic acid vapor as described in Example 3 and is then heated as described in Example 7. A lead acid battery having two negative electrodes and one positive electrode, with two layers of the web produced as described in this Example wrapped around the positive electrode as a separator, is charged at 1.5 amperes, and its discharge capacity is determined.

It will be appreciated that various changes and modifications can be made from the specific details of the invention as disclosed in the foregoing examples without departing from the spirit and scope thereof as defined in the following claims, and that, in one aspect the invention is a method for producing a separator which comprises forming grafting sites on a non-woven sheet of polyolefin fibers by subjecting the sheet to glow discharge plasma, or to electron beam irradiation, contacting the resulting sheet with monomeric acrylic acid or another vinyl monomer capable of reacting with an acid or a base to form a salt directly or indirectly, and causing the acrylic acid or other vinyl monomer to react with the polyolefin fibers at the grafting sites by (1) irradiating the grafting sites on the polyolefin fibers with gamma or electron beam radiation while the monomeric acrylic acid or other vinyl monomer is in contact with the fiber surfaces, (2) irradiating the grafting sites on the polyolefin fibers with ultra violet light while the monomeric acrylic acid or other vinyl monomer is in contact with the fiber surfaces and the non-woven sheet is in an inert gas atmosphere, or (3) heating the polyolefin fibers while the monomeric acrylic acid or other vinyl monomer is in contact with the fiber surfaces.

In the foregoing method, and in methods which are subsequently summarized herein, it is usually preferred that the fibers in the non-woven sheet have an average diameter in the range of 0.2 to 30 microns, preferably from 1 to 20 microns. It is also preferred that the fibers have a surface area of approximately 0.1 to 20 square meters per gram, and most desirable that the surface area be from about 0.2 to 10 square meters per gram. Further, it is usually preferred that the non-woven sheet have a thickness from about 50 to 3000 microns, although electron beam treatment of a non-woven sheet thicker than about 300 microns is difficult, and high power is required for treating a sheet thicker than 300 microns by glow discharge. Most desirably, therefore, the non-woven sheet has a thickness not greater than about 300 microns.

The glow discharge plasma used in practicing the instant invention usually has a power of from 1 to 500 W.

The electron beam irradiation used in practicing the instant invention is usually to a total dose of 1 to 15 M rads, preferably from 3 to 7 M rads.

The heating step used to cause the acrylic acid or other vinyl monomer to react with the polyolefin fibers in the embodiment summarized above, is usually to a temperature from 100° F. to 150° F.

In a second aspect, the invention is a method which is exemplified by Example 4, supra. The method involves applying to a non-woven sheet of polyolefin fibers a coating of acrylic acid and another ethylenically unsaturated monomer, and irradiating the coating, while in an inert atmosphere, with UV. The other monomer is one which is polymerizable by addition polymerization to a thermoplastic polymer, and is hydrophilic as a consequence of containing COOH, OH, sulfonyl, sulfonic acid or carbonyl groups, or is one which has one of the following formulas:

The proportions in which acrylic acid and the other monomer are used in the procedure of Example 4 can be varied, although somewhat near the 5 parts of the former to the 1 part of the latter used in the example is presently deemed to be optimum. In general, useful coatings can be produced when the acrylic acid is as much as 10 parts per part of the other monomer, or as little as 1 part per part of the other monomer.

In the formulas of the preceding paragraph, R is an aliphatic or aromatic hydrocarbon group having from 2 to 8 carbon atoms, R4 is hydrogen or methyl, n is an integer from 2 to 15, and $X^+$ is a cation selected from the group consisting of hydrogen, alkali metal cations, alkaline earth cations, cations of the transition metals Sc, Ti, V, Cr, Mn, Fe, Co, Ni, Cu and Zn, and ammonium cations of the following formula:

where each of $R_5$, $R_6$, $R_7$ and $R_8$ is hydrogen, alkyl, alkenyl, cycloalkyl or cycloaklkenylene, and not more than one is a bivalent group bonded to $N^+$ and formed by removing two hydrogens from an alkane, an alkene, a cycloalkane or a cycloalkene; the total number of carbons in $R_5$ $R_6$, $R_7$ and $R_8$ does not exceed 21. Substituents having the formula $R_5R_6R_7R_8N^+$ are disclosed in U.S. Pat. No. 6,100,225, Aug. 8, 2000.

In a third aspect, the invention is a method for producing a battery separator which comprises applying a coating of a polymerizable material to polyolefin fibers of a non-woven sheet and polymerizing the coating.

The polymerizable coating is of an ethylenically unsaturated monomer which is polymerizable by addition polymerization to a thermoplastic polymer which is hydrophilic as a consequence of containing COOH, OH, sulfonyl, sulfonic acid or carbonyl groups, or a monomer which has one of the following formulas:

where R is an aliphatic or aromatic hydrocarbon group having from 2 to 8 carbon atoms, R4 is hydrogen or methyl, n is an integer from 2 to 15, and $X^+$ is a cation selected from the group consisting of hydrogen, alkali metal cations, alkaline earth cations, cations of the transition metals Sc, Ti, V, Cr, Mn, Fe, Co, Ni, Cu and Zn, and ammonium cations of the following formula:

where each of $R_5$ $R_6$, $R_7$ and $R_8$ is hydrogen, alkyl, alkenyl, cycloalkyl or cycloaklkenyl, and not more than one is a bivalent group bonded to $N^+$ and formed by removing two hydrogens from an alkane, an alkene, a cycloalkane or a cycloalkene; the total number of carbons in $R_5$ $R_6$, $R_7$ and $R_8$ does not exceed 21.

In a fourth embodiment, the instant invention also involves forming fibers from a polyolefin and a photoinitiator, and then immersing the fibers in a solution of an acrylic or the like monomer and subjecting the fibers to UV irradiation while the acrylic acid or the like monomer solution is on their surfaces.

In a fifth embodiment, the invention involves forming fibers from a polyolefin, applying an otherwise conventional sizing composition which contains benzophenone, acetophenone or the like photoinitiator to the fibers, and then immersing the fibers in a solution of an acrylic or the like monomer and subjecting the fibers to UV irradiation or to ionizing radiation while the acrylic or the like monomer solution is on their surfaces.

In yet another embodiment, the invention involves using a plasma to effect graft polymerization of an acrylic or the like monomer with polyolefin fibers, for example, by introducing the fibers to be graft polymerized into an argon or helium plasma to form free radicals on the fiber surfaces and then bringing an acrylic or the like monomer into contact with the free radicals on the fiber surfaces.

In a further embodiment, the invention involves introducing the polyolefin fibers into a plasma and varying the gas and plasma conditions to make the fiber surfaces hydrophilic.

In another embodiment, the invention involves introducing an acrylic monomer into a plasma to cause it to undergo polymerization, and introducing polyolefin fibers into the plasma so that their surfaces contact and adhere to the polymer.

In still a further embodiment, the invention involves treating a non-woven sheet of polyolefin fibers with a plasma to generate active sites, vaporizing an acrylic monomer or oligomer, feeding the vaporized monomer or oligomer through a slot die and into contact with the non-woven sheet so that the monomer or oligomer condenses on the surfaces of the polyolefin fibers, and exposing the monomer or oligomer on the polyolefin fiber surfaces to electron beam or ultraviolet radiation to cure the monomer or oligomer on the fiber surfaces.

Various changes and modifications are possible from the details of the invention described above without departing from the spirit and scope thereof as defined in the following claims.

I claim:

1. A battery separator comprising at least one first layer of fabric containing polyolefin fibers, from 20 percent to 80 percent by weight of which are dividable fibers composed of polypropylene segments and polyethylene segments, and from 10 percent by weight to 50 percent by weight of which are sheathcore fibers having a polypropylene core and a polyethylene sheath, with the proviso that the surfaces of the polyolefin fibers are hydrophilic as a consequence of exposure to plasma discharge in the presence of at least one of oxygen, nitrogen and argon, and at least one second layer which is a wetlaid or drylaid glass fiber sheet, a porous polymer film, a meltblown web of polymer fibers, a drylaid web composed of glass fibers and polymer fibers, a woven glass fiber web or a woven polymer fiber web, with the proviso that the layers of said separator are bonded together.

2. A battery separator as claimed in claim 1 wherein said firs and second layers are chemically bonded together.

3. A battery separator as claimed in claim 1 wherein said first and second layers are heat bonded together.

4. A battery separator as claimed in claim 1 wherein said first and second layers are mechanically entangled together.

5. A battery separator as claimed in claim 1 wherein said first and second layers are hydroentangled together.

6. A method for producing a battery separator which comprises advancing the fibers of a non-woven sheet from 50 to 3000 icrons thick of polyolefin fibers, which fibers have an average fiber diameter from 0.2 to 30 microns and a surface area greater than 0.2 square meter per gram, through an atmosphere, in vapor form, of an ethylenically unsaturated monomer which is polymerizable by addition polymerization to a polymer which is hydrophilic as a consequence of containing COOH, OH, sulfonyl, suifonic acid or carbonyl groups, or a monomer which has one of the following formulas:

-continued where R is an aliphatic or aromatic hydrocarbon group having from 2 to 8 carbon atoms, R4 is hydrogen or methyl, n is an integer from 2 to 15, and is a cation selected from the group consisting of hydrogen, alkali metal cations, alkaline earth cations, cations of the transition metals Sc, Ti, V, Cr, Mn, Fe, Co, Ni, Cu and Zn, and ammonium cations of the following formula:, removing heat from the non-woven sheet to cause the monomer to condense thereon, and polymerizing the monomer in situ on the fiber surfaces.

7. A method as claimed in claim 6 for producing a battery separator wherein the fibers of the non-woven sheet, before the coating of a monomer is applied thereto, are subjected to electron beam irradiation, total dose 3 to 10 M rads.

8. A method as claimed in claim 6 for producing a battery separator wherein the monomer is a mixture of acrylic acid and p-styrene sulfonic acid.

9. A lead acid battery comprising at least one positive plate, at least one negative plate, electrical conductors operably connecting said plates, and a battery separator comprising at least one sheet produced by the method claimed in claim 7 between adjacent positive and negative plates.

10. A lead acid battery comprising at least one positive plate, at least one negative plate, electrical conductors operably connecting said plates, and a battery separator comprising at least one sheet produced by the method claimed in claim 8 between adjacent positive and negative plates.

11. A lead acid battery comprising at least one positive plate, at least one negative plate, electrical conductors operably connecting said plates, and, between adjacent positive and negative plates, a battery separator from 50 to 3000 microns thick and composed of at least one sheet produced by subjecting the fibers of a non-woven sheet of polyolefin fibers having an average fiber diameter from 0.2 to 0 microns and a surface area from 0.1 to 20 square meters per gram to electron beam irradiation, total dose 3 to 10 M rads, and applying to the irradiated fibers a coating of an ethylenically unsaturated monomer which is polymerizable by addition polymerization to a polymer which is hydrophilic as a consequence of containing COOH, OH, sulfonyl, sulfonic acid or carbonyl groups, or a monomer which has one of the following formulas:

-continued where R is an aliphatic or aromatic hydrocarbon group having from 2 to 8 carbon atoms, $R_4$ is hydrogen or methyl, n is an integer from 2 to 15, and $X^+$ is a cation selected from the group consisting of hydrogen, alkali metal cations, alkaline earth cations, cations of the transition metals Sc, Ti, V, Cr, Mn, Fe, Co, Ni, Cu and Zn, and ammoum cations of the following formula:

and polymerizing the monomer in situ on the fiber surfaces.

12. A lead acid battery comprising at least one positive plate, at least one negative plate, electrical conductors operably connecting said plates, and, between adjacent positive and negative plates, a battery separator from 50 to 3000 microns thick and composed of at least one sheet produced by subjecting the fibers of non-woven sheet of polyolefin fibers having an average fiber diameter from 0.2 to 0 microns and a surface area from 0.1 to 20 square meters per gram to electron beam irradiation, total dose 3 to 10 M rads, and applying to the irradiated fibers a coating comprising a mixture of acrylic acid and p-styrene sulfonic acid, and polymerizing the monomer mixture in situ on the fiber surfaces.

13. A method for producing a battery separator which comprises forming grafting sites on a non-woven sheet of polyolefin fibers by subjecting he sheet to glow discharge plasma, or to electron beam irradiation, contacting the resulting sheet with monomeric acrylic acid or another vinyl monomer capable of reacting with an acid or a base to form a salt directly or indirectly, and with from 2 percent to 50 percent of a copolymerizable monomer which is triallyl isocyanurate (TAIC), triallyl cyanurate (TAC), 1,5-hexadiene-3-ol, 2,5-dimethyl-l,5-hexadiene, 1,5-hexadien, 1,7-octadiene, 3,7-dimethyl-2,6-octadiene-1-ol, polyethylene glycol diacrylate, polyethylene glycol dimethacrylate or divinylbenzene, based upon the weight of the acrylic acid or other vinyl monomer and of the copolymerizable monomer, and causing the acrylic acid or other vinyl monomer and the copolymerizable monomer to react with the polyolefin fibers at the grafting sites by (1) irradiating the grafting sites on the polyolefin fibers with gamma or electron beam radiation while the monomeric acrylic acid or other vinyl monomer is in contact with the fiber surfaces, (2) irradiating the grafting sites on the polyolefin fibers with ultra violet light while the monomeric acrylic acid or other vinyl monomer is in contact with the fiber surfaces, or (3) heating the polyolefin fibers while the monomeric acrylic acid or other vinyl monomer is in contact with the fiber surfaces.

* * * * *